United States Patent [19]
Coakley

[11] 3,877,594
[45] Apr. 15, 1975

[54] CAR TOP BOAT CARRIER WITH LOADER AND UNLOADER

[76] Inventor: Donald L. Coakley, 101 Washington, Golden, Colo. 80401

[22] Filed: Nov. 21, 1973

[21] Appl. No.: 417,974

[52] U.S. Cl................................ 214/450; 214/85.1
[51] Int. Cl.............................................. B60p 3/10
[58] Field of Search...................... 214/450, 85, 85.1

[56] References Cited
UNITED STATES PATENTS

| | | | |
|---|---|---|---|
| 3,128,893 | 4/1964 | Jones | 214/450 |
| 3,411,644 | 11/1968 | Cook | 214/450 |
| 3,648,866 | 3/1972 | Slown | 214/450 |
| 3,732,998 | 5/1973 | Martin | 214/450 |
| 3,734,321 | 5/1973 | Long | 214/450 |

*Primary Examiner*—Robert J. Spar
*Assistant Examiner*—Jerold M. Forsberg
*Attorney, Agent, or Firm*—Richard D. Law

[57] ABSTRACT

An overhead framework having supports secured to a vehicle's bumpers includes a central beam having a reciprocable walking beam controlled by a pull rope, and a small boat trailer, fastenable to a rider on the walking beam, loads and unloads from the vehicle on the walking beam. The walking beam moves from a horizontal framework held position to a sloped load-unload position with one end resting on the ground and the other on the central beam.

6 Claims, 9 Drawing Figures

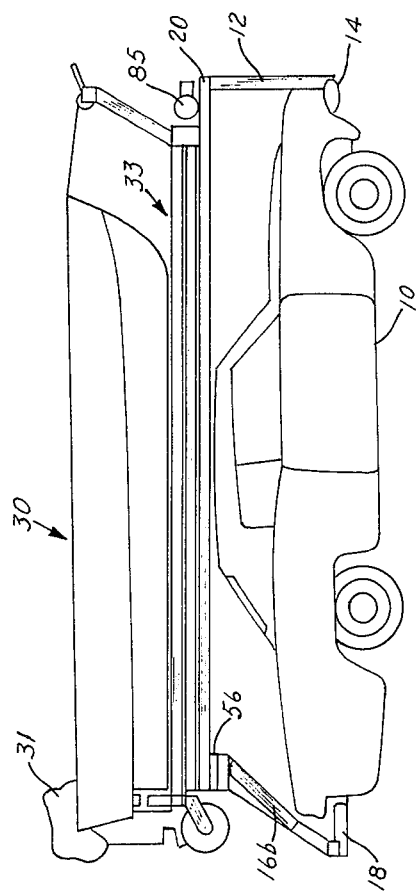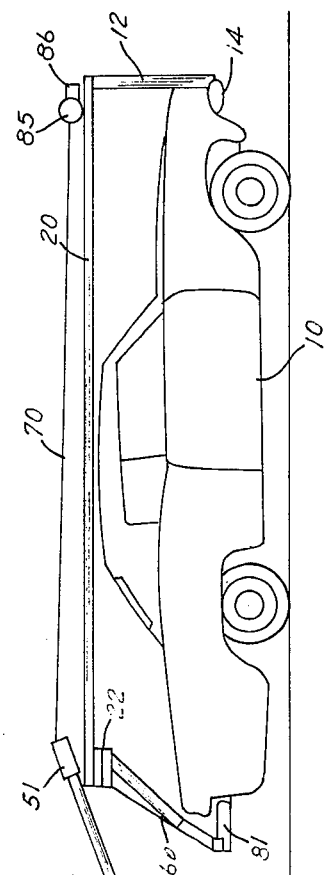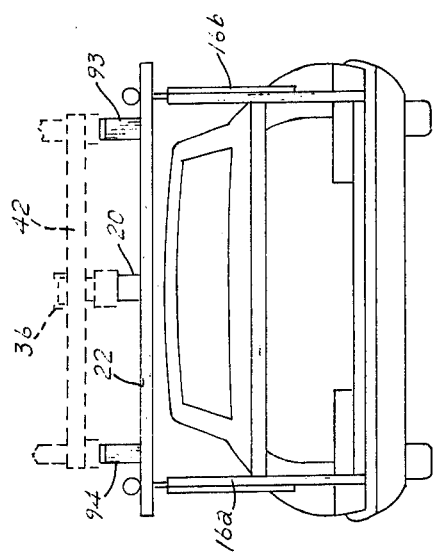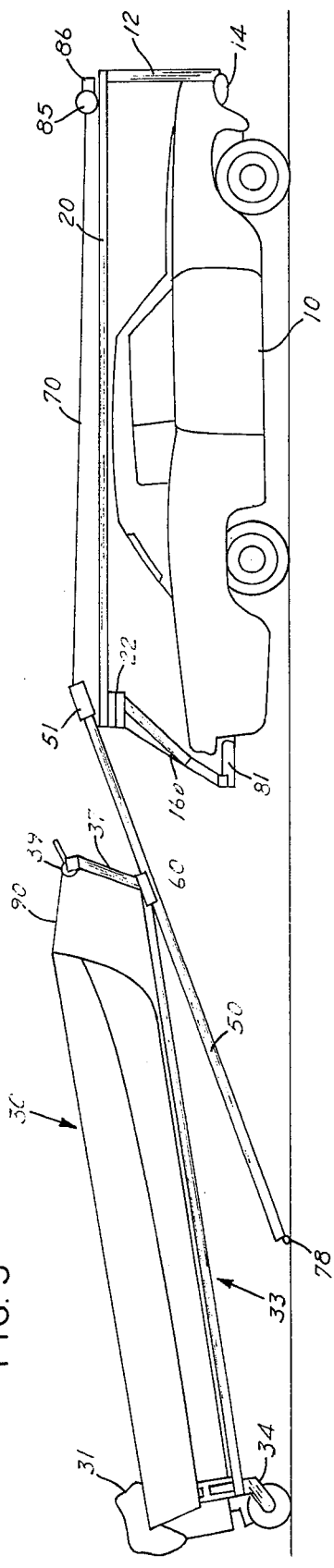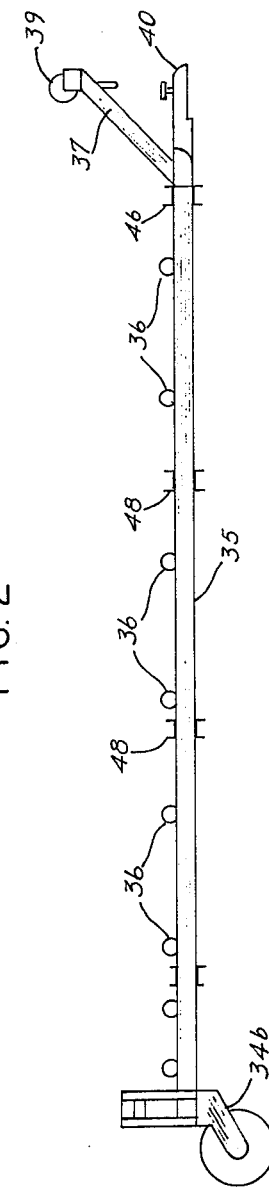

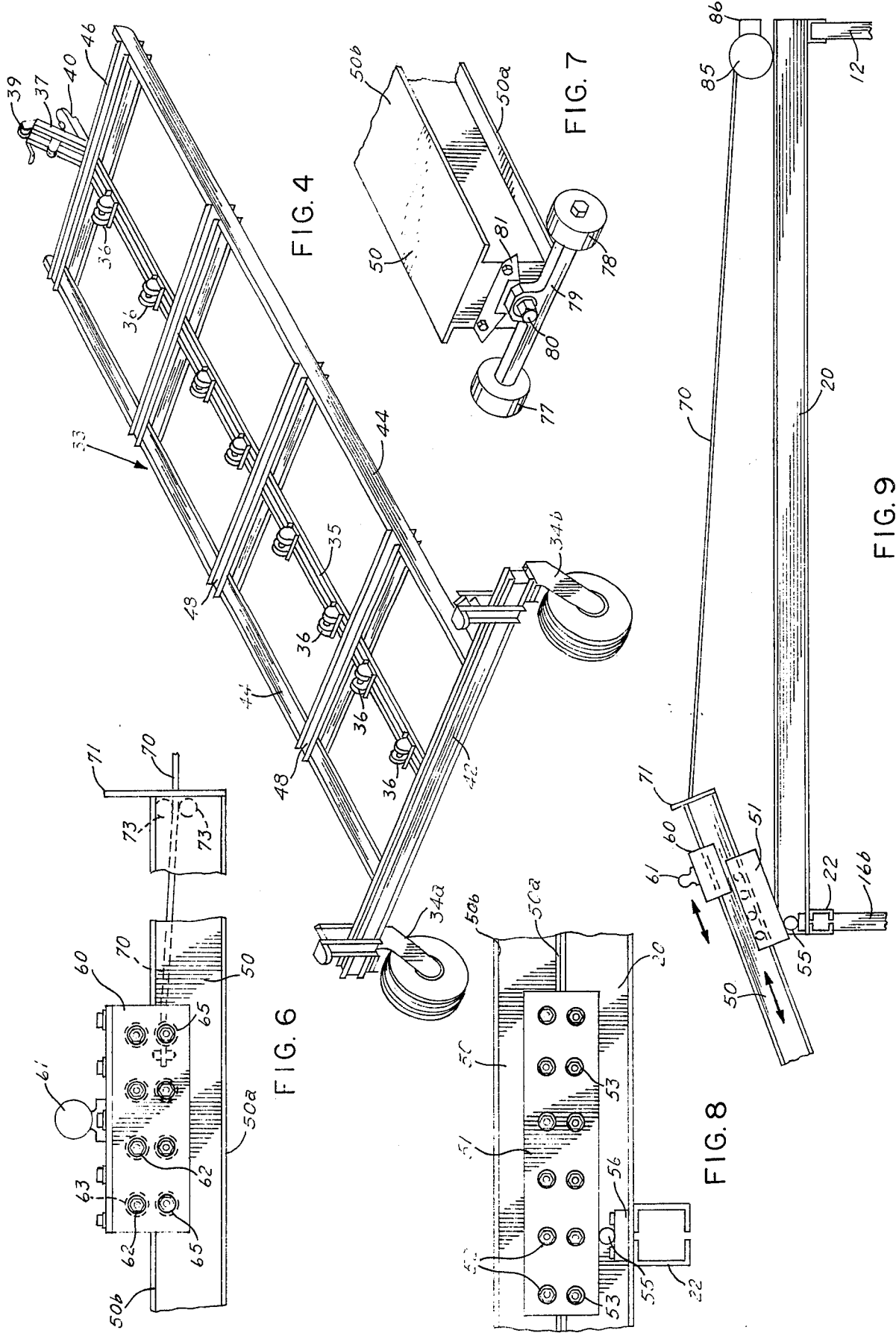

CAR TOP BOAT CARRIER WITH LOADER AND UNLOADER

Small boats, usually of the fishing boat variety, have traditionally been placed upside down on car top racks on vehicles, especially passenger automobiles. Numerous loading and uloading devices have heretofore been proposed for mounting and dismounting a boat from the top of a vehicle. A few of such devices are commercially available. None of the known loaders are usable by infirm persons who are incapable of loading and unloading such boats by themselves. Even with the loading and unloading devices available, the size of such boats which are top mounted for hauling by vehicles has been limited to quite small sizes. Boats of a length of 10–16 feet have been transportable, but if the boat gets much above 12 feet, at least two strong men are necessary to place the boat upon the car top carrier, even with the available loading devices.

Commercially available loading and unloading devices which place the boat upside down on a car top carrier do not have facilities for transporting the boat once it is upon the ground. To move a boat once it is on the ground, auxiliary wheels have been used on one end of the boat so that the other end may be raised and carried with the boat being pushed on the attached wheels. Obviously, such an arrangement cannot be used by invalids and infirm people who are incapable of lifting the one end of the boat.

Invalids and infirm people are simply not capable of using the commercially available car top carriers unless they have help in the loading and unloading, and the transportation of the boat once it is free from the vehicle. This eliminates a vast majority of persons, particularly retired persons, who would like to use such a carrier. Furthermore, with larger boats, on the order of 18 feet and larger, a lone man, even a muscle man, has extreme difficulty in using the existing car-top carriers for loading and unloading the boats from the vehicle.

With conventional devices for mounting a boat upside down on a vehicle, the normally carried objects of the boat must be carried inside of the vehicle. Thus, outboard motors, gas cans, oars, seats, life jackets, and the like must be carried inside of the vehicle. With large outboard motors, this requires an additional handling problem of placing the outboard motor either in the back of the vehicle, such as a station wagon, or in the trunk of the vehicle.

According to the present invention, there is provided a car-top carrier for a boat mounted in upright position on the carrier. The invention includes a lightweight, small wheeled boat trailer useful for very short hauls and arranged to be attached to a rider on a walking beam. The walking beam is reciprocally mounted in a pivoted holder at the rear of framework carried by the vehicle, which permits the walking beam to move from a horizontal held position on the framework to a sloped position for loading and unloading a boat. In its horizontal position in the framework, the walking beam helps to support the boat in right side up condition on the vehicle and in a slanted position permits the small boat trailer to move up and down the sloped beam onto the ground. A front mounted winch on the vehicle framework provides means for easily and quickly loading and unloading a boat from the car-top carrier. Further, the boat is unloaded to its full down position on the ground a substantial distance from the carrying vehicle, and thus the boat may be launched with the carrying vehicle a substantial distance from the water. The carrying vehicle need not get closer than the distance of the walking beam to the water for launching and loading the boat. By using an electric winch, the boat may be loaded or unloaded with little, if any, effort. Furthermore, since the boat trailer wheels are very small, the trailer sits lower than conventional trailers and therefore does not have to extend as far into the water for floating, as with conventional trailers.

It is, therefore, an object of the present invention to provide a simply used, and almost effortless, car-top boat carrier.

Another object of the invention is to provide a car-top carrier for a boat held in upright position mounted on a framework above the vehicle.

Yet another object of the invention is to provide a car-top carrier for a right side up boat, so that the boat may be unloaded directly for entry into the water.

Still another object of the invention is to provide a car-top carrier with a load and unload capability, whereby the transport vehicle may be maintained a substantial distance removed from the water.

Another object of the invention is to provide a car-top carrier for a boat utilizing a small, low profile boat trailer with small wheels useful for only very local transportation and which mounts on a framework mounted on the vehicle.

An additional object of the invention is to provide a car-top carrier for a boat arranged on a small, low profile, lightweight trailer, which trailer loads and unloads on a walking beam attached to the framework of the carrier.

A further object of the invention is to provide a car-top carrier for a boat in which the load-unload arrangement is accomplished by a single pull rope mounted on a winch.

These and other objects and advantages of the invention may be readily ascertained by referring to the following description and appended illustrations, in which:

FIG. 1 is a generally schematic side view of an upright boat mounted on a vehicle in a car-top carrier according to the invention;

FIG. 2 is a generally schematic side elevational view of the device of FIG. 1 illustrating the load-unload technique using the walking beam of the car-top carrier of the invention;

FIG. 3 is a generally schematic rear view of the car-top carrier of the invention;

FIG. 4 is a perspective view of a boat trailer portion of a car-top carrier arrangement for mounting boats in upright position on a vehicle in accordance with the invention;

FIG. 5 is a side elevational view of the trailer device of FIG. 4;

FIG. 6 is a side elevational detail of the trailer supporting walking beam rider according to the invention;

FIG. 7 is a prespective view of the ground contacting end of the walking beam of the invention;

FIG. 8 is a side elevational detail of the pivot and reciprocable holder means for the walking beam; and FIG. 9 is a generally schematic side elevational detail of the action of the walking beam, trailer ball hitch arrangement and the car-top carrier frame in a load-unloaded position.

In the device selected for illustration in FIGS. 1, 2 and 3, a conventional passenger vehicle 10 is provided with a front support 12 mounted on front bumper 14 and a pair of rear bumper supports 16a and 16b mounted on rear bumper 18. The rear uprights are secured together by a horizontal member 22. The front and rear upright supports 16a and 16b are secured together by means of a central beam 20, which is secured to the front upright 12 and to the lateral support 22. Various other lateral supports may be provided, if desired, on the beam 20 at various points between the front and rear uprights to provide means for holding the upright boat in its carried position. The number of such laterals is determined by the size of the vehicle and the size of the boat to be carried thereby. In some instances, it may be desirable to provide the front of the vehicle with a pair of upright supports with the central beam 20 mounted on a lateral similar to the lateral 22 of the rear support. However, for normal purposes, the T shaped support framework provides adequate support for a boat normally carried on the vehicle. In many instances, the bumpers of a vehicle are secured in position by means of a bolt passing through an elongated hole in the bumper supports, which are used to align the bumper correctly with the body. Preferably, for carrying heavy loads on such an overhead framework, various types of fastening means may be used to secure the bumper in its relationship with the body, so that the load will not push the bumper out of its alignment in the slot.

A boat, as shown in general by numeral 30, with a mounted outboard motor 31 is arranged to be carried on a small, low profile boat trailer, as shown in detail in FIG. 4. The small boat trailer, shown in general by numeral 33, includes a pair of small caster wheels 34a and 34b. The boat trailer, as shown in FIGS. 4 and 5, includes a central beam 35 with a plurality of boat keel rollers 36 mounted at spaced intervals therealong to permit a boat to be pulled up the beam 35. Such rollers are conventional on normal boat trailers and are usually made of reasonably hard rubber or plastic to permit a keel of a boat to be pulled along the trailer to provide ease of mounting the boat on the trailer. Where desired uprights may be provided on the stringers 44 to aid in holding the boat upright in the trailer, a winch support 37 mounting a winch 39 provides power means for pulling the boat into the trailer along the rollers 36. Such uprights and hand winches are conventional in conventional type boat trailers. The forward end of the beam 35 is provided with a trailer hitch 40, of conventional design, to fit over a ball of a trailer hitch, and it includes a conventional means for locking the ball holder onto the ball. The wheels 34a and 34b are mounted on a lateral beam 42 which is attached to the mid-beam 35 and stringers 44, also attached to the rear lateral 42, are attached at their front end to a front lateral 46 adjacent the winch upright 37. A plurality of double lateral supports 38 may be provided along the boat trailer at the points where desired to add strength to the boat trailer for supporting a boat. Furthermore, the stringers 44 may be used to attach lines from the boat gunwale to the stringers for securing the boat in its upright position on the trailer. The casters for the boat trailer are preferably not much larger than about 5 inches, so that the overall boat trailer is of a low profile to the ground which, also, permits a boat to be launched from or loaded on the trailer in very shallow water.

The boat trailer, with or without a boat attached to it, is moved upwardly and downwardly along a walking beam 50, of generally a pair of spaced apart channels, which is reciprocally mounted in a pivot bracket 51, FIG. 8, to the longitudinal beam 20 (which may be a box beam) of the framework attached to the vehicle. The pivotal fixture or bracket 51 includes side members secured together by a plurality of bolts 52 on which are mounted rollers which bear against the top surface of flange 50a of the walking beam. Lower bolts 53 support rollers against the bottom of the flange 50a and permit the walking beam 50 to pass freely through the fixture 51. The fixture 51 is pivoted on a pivot 55 secured in a pillow block 56 which is mounted, in turn, on a lateral beam 22 which extends between the uprights 16a and 16b of the vehicle framework. The pivot means may be a single shaft secured to the fixture 51, or it may be separate shafts providing a double bearing pivot means for the fixture. The rollers, not shown, mounted on the opposite sides of the side plates may be plastic or other types of rollers mounted on the bolt type shafts and bearing against the upper and lower portions of flange 50a of the beam 50. The same is true for the other side.

Mounted on the upper flange 50b of the walking beam 50 is a reciprocable fixture 60 which includes a ball hitch 61 mounted on the top surface thereof, FIG. 6. A plurality of shafts 62 extend through the fixture 61 and provide means for roller members 63 mounted on the top surface of the beam 50 to provide free reciprocating movement of the fixture 60 on the beam. A plurality of lower shaft and roller arrangements bearing against the underside of flange 50b of the beam 50 prevents upward removal of the fixture 60 from the beam. The fixture 60 is moved by means of a haul rope 70 passing through a fixture stop 71, mounted on the end of beam 50, which prevents movement of the fixture 60 from the beam 50. The haul rope 70 is secured to the fixture 60 for moving it along the walking beam 50. The haul rope 70 passes internally of the beam 50 and a pair of rollers 73 provide means for easy movement of the rope through the fixture stop 71, whereby the fixture 60 may move forwardly and aft of the beam 50. The rear portion of the beam 50, FIG. 7, includes a pair of small wheels 77 and 78 mounted on a pivot support 79 secured by pivot pin 80. A stop 81 prevents the wheels from pivoting completely around and provides a small angular movement of the wheels in relation to the beam. The wheels 77 and 78 are arranged as ground bearing wheels for permitting the walking beam to move on the ground toward and away from the vehicle for the small distance involved in the loading and unloading of the boat along the walking beam 50.

The haul rope 70 is wound on a spool 85 controlled by means of an electric motor 86. The electric motor 86 should be a two way motor for winding and unwinding the pull rope 70. Furthermore, where desired, the spool 85 may be a hand winch type for releasing and retrieving the haul rope 70.

In using the device of the invention, the car-top carrier is mounted on the vehicle by means of the three or four upright members attached to the front and rear bumpers with the middle longitudinal stringer 20 mounted therebetween. The carrier should be made adjustable to fit various sizes of vehicles, as may be desired. In loading a boat onto the carrier, the haul rope 70 pulley is released and the walking beam 50 is pulled from the carrier and placed into a sloping position, as shown in FIG. 2. The beam is pivotally attached to the carrier and is resting on the ground by means of the small rollers 77 and 78. Where the vehicle is on a slope, e.g. a boat ramp, the beam will release itself. The fixture containing the ball hitch 61 is moved or permitted to move down the walking beam after the beam is fully extended on fixture 51 and resting on the ground. The ball hitch with its attached pull rope 70 is moved to the end of the beam 50, and the stop 81, also, provides a stop for the fixture 60. The boat trailer 33, with or without a boat mounted thereon, is then attached to the ball hitch 61. With the trailer hitch attached to the ball 61, the haul rope 70 is retrieved so that the fixture moves up the walking beam 50 to approximately the stop 71 on the forward end of the walking beam. In this position, the trailer 33 is mounted fully on the walking beam 50, and further retrieval of the haul rope 70 pulls up the walking beam with its carried boat trailer toward the top of the car. Obviously, the boat will be at an angle until the walking beam and the carried trailer reach the balanced point of the load, at which point the rope is slowed down and the boat trailer and walking beam are permitted to tilt over onto the carrier. Once the boat is down, the haul rope is further retrieved, pulling the boat trailer and walking beam on top of the vehicle. In this position, the walking beam is on the central beam 20 and the boat trailer is fully forward. A pair of uprights 93 and 94 mounted on the cross beam 22 provide balance for the trailer, by means of the stringers 44 moving along rollers (not shown) on top of the uprights 93 and 94. Once the boat is pulled to its forward position, shown in FIG. 1, the boat and the trailer may be secured to the carrier, as by lines, tie-downs and the like, to secure the boat to the carrier.

The unloading is performed in a reverse manner. All tie-downs are released. Usually, the vehicle is on a boat ramp, and is on a slope. The pulley for the haul rope is released and the boat trailer and the beam move by gravity rearwardly of the vehicle. At the balance point, the beam with the trailer starts tipping, being held by the rope. The rope is further released and the beam comes to rest on the ground on the wheels 77 and 78. Further release of the rope releases the boat and trailer, with the trailer wheels 34a and 34b permitting the trailer to move rearwardly. When the fixture 60 is at the rear of the walking beam, it is almost on the ground and the trailer is in the water. The boat may be released from the trailer. With a small landing gear on the trailer front, it may then be moved around for short distances. It is noted that the vehicle is not in the water, since the walking beam spans the distance from the vehicle to the water.

It is noted that, with the trailer on the walking beam and the fixture 60 at the front of the walking beam, the beam is reciprocated in the fixture 60. Once the beam is sloped, as in FIG. 2, the fixture 60 may be moved up and down the beam. If desired, a small motor and haul rope may be used to pull the walking beam from the carrier. This is used only until the balance point is reached, after which gravity will pull the beam.

In an actual trial, a fully loaded 18 foot boat was carried on a medium size vehicle. The loaded boat weighed about 600 pounds. This weight is distributed to the three uprights at about 200 pounds each. Overload springs may be used to take up the extra load.

I claim:

1. A vehicle-top boat carrier with loader-unloader comprising
   a. frame means including an upstanding front bumper mounted support and a pair of spaced apart rear bumper mounted supports secured to the vehicle and providing a central, generally horizontal elongated member extending generally longitudinally and above the vehicle.
   b. an elongated walking beam having ground contacting wheels; said beam being reciprocably mounted on said elongated member, and stop means on both ends of said beam,
   c. means including a pivotal fixture attached to the elongated member securing said walking beam to said elongated member and permitting reciprocable movement of said walking beam rearwardly of said elongated member and permitting tilting and ground movement of said walking beam at the rear of said elongated member,
   d. boat holding means including spaced apart ground contacting wheels providing a low profile unit, including spaced apart boat stabilizing rails extending longitudinally and means for supporting a boat, said boat holding means capable of receiving and carrying a boat during loading and transportation of the boat
   e. reciprocable means mounted on and arranged for reciprocal movement along said walking beam between said stop means and including boat holding attachment means for securing said boat holding means thereto, and
   f. haul rope means secured to said reciprocable means and to a forward portion of said frame means, whereby movement of the rope first causes movement of the reciprocable means along said walking beam until it engages the forwardmost of the stop means, continued movement of the rope causes said reciprocable means along with said walking beam to move forwardly, pivot about said pivotal fixture, and then reciprocate along said frame means.

2. A vehicle-top boat carrier according to claim 1 wherein said walking beam includes opposed upper and lower extending flanges, and roller means in said pivotal fixture acting on said lower flange permits free reciprocable movement therein.

3. A vehicle-top boat carrier according to claim 1 wherein said boat trailer includes keel rollers for free movement of a boat on said boat trailer.

4. A vehicle-top boat carrier according to claim 1 wherein said haul rope is reeled on a spool of a winch mounted adjacent the front of said frame means.

5. A vehicle-top boat carrier according to claim 4 wherein said winch is electric, operated by the battery of the vehicle.

6. A vehicle-top boat carrier according to claim 1 wherein said reciprocable means along said walking beam includes a ball and said boat holding means includes a ball hitch.

* * * * *

UNITED STATES PATENT OFFICE
CERTIFICATE OF CORRECTION

PATENT NO. : 3,877,594
DATED : April 15, 1975
INVENTOR(S) : Donald L. Coakley

It is certified that error appears in the above-identified patent and that said Letters Patent are hereby corrected as shown below:

In Column 3, Line 59 change "38" to --48--.

Signed and Sealed this twenty-second Day of July 1975

[SEAL]

Attest:

RUTH C. MASON
Attesting Officer

C. MARSHALL DANN
Commissioner of Patents and Trademarks